United States Patent [19]

Ishikuro et al.

[11] Patent Number: 5,036,629

[45] Date of Patent: Aug. 6, 1991

[54] METHOD FOR PREPARING A MAGNETIC RECORDING MEDIUM

[75] Inventors: Tadashi Ishikuro; Shinobu Iida; Masaaki Fujiyama, all of Kanagawa, Japan

[73] Assignee: Fuji Photo Film Co., Ltd., Kanagawa, Japan

[21] Appl. No.: 614,945

[22] Filed: Nov. 19, 1990

Related U.S. Application Data

[63] Continuation of Ser. No. 340,357, Apr. 19, 1989, abandoned.

[30] Foreign Application Priority Data

Apr. 19, 1988 [JP] Japan .................................. 63-97383

[51] Int. Cl.$^5$ ............................................. B24B 21/04
[52] U.S. Cl. ................................. 51/281 R; 51/328; 51/324
[58] Field of Search ....................... 51/328, 326, 281 R, 51/281 SF, 324; 15/100 R, 1.5 R

[56] References Cited

U.S. PATENT DOCUMENTS

| | | | |
|---|---|---|---|
| 3,069,815 | 12/1962 | Valentine | 51/328 |
| 3,701,178 | 10/1972 | Kuntz | 15/100 |
| 4,138,229 | 2/1979 | Tadokoro et al. | 51/295 |
| 4,213,222 | 7/1980 | Schoettle et al. | 15/100 |
| 4,254,585 | 3/1981 | Schoettle et al. | 51/324 |
| 4,315,294 | 2/1982 | Wilson | 15/100 |
| 4,324,014 | 4/1982 | Stutz, Jr. et al. | 15/100 |
| 4,514,937 | 5/1985 | Gehrung et al. | 51/328 |
| 4,629,653 | 12/1986 | Asai et al. | 428/328 |
| 4,666,770 | 5/1987 | Asai et al. | 428/323 |

Primary Examiner—Robert A. Rose
Attorney, Agent, or Firm—Sughrue, Mion, Zinn, Macpeak & Seas

[57] ABSTRACT

A method for preparing a magnetic recording medium comprising a non-magnetic support having thereon a magnetic layer comprised of ferromagnetic particles of hexagonal crystalline ferrite which comprises smoothing the surface of the magnetic layer and thereafter abrading the surface thereof by an abrasive tape.

7 Claims, 1 Drawing Sheet

5,036,629

METHOD FOR PREPARING A MAGNETIC RECORDING MEDIUM

This is a continuation of patent application Ser. No. 340,357, filed Apr. 19, 1989, now abandoned.

FIELD OF THE INVENTION

The present invention relates to a method for preparing a magnetic recording medium comprising a non-magnetic support having thereon a magnetic layer.

BACKGROUND OF THE INVENTION

A magnetic recording medium comprising a non-magnetic support having thereon a magnetic layer containing ferromagnetic particles dispersed in a binder is generally used as an audio tape, a video tape or a computer tape.

This type of magnetic recording medium is usually prepared by coating a magnetic coating composition containing a binder such as a resin and ferromagnetic particles dispersed in a solvent on a non-magnetic support to form a coated layer, providing the coated layer with a magnetic orientation treatment, a drying treatment and a surface smoothing treatment and thereafter slitting to a desired shape.

Recently, recording media with higher density have been developed to respond to the demand for increasing the recording density of recorded information. It is known that ferromagnetic particles of hexagonal crystalline ferrite are used in the magnetic recording medium to meet the above requirement, as disclosed in JP-B-60-50323. (The term "JP-B" as used herein means an "examined Japanese patent publication".) A magnetic recording medium using this hexagonal crystalline ferrite is very suitable as a perpendicularly magnetic recording medium. The hexagonal crystalline ferrite is a plate-like particle, and a magnetic recording medium using the above hexagonal crystalline ferrite suffers from more serious problems, as discussed below, than those exhibited by a magnetic recording medium prepared from conventional magnetic particles.

A tape of a high speed printing medium for DAT soft using hexagonal crystalline ferrite has been suggested as a high density recording medium. In this DAT soft (DAT tape), error rate is one of the important characteristics used to evaluate the efficiency of the tape. The error rate means a rate of misreading signals at the time of reproducing signals on the DAT tape. Seeing that the error rate increases as the number of drop outs occurring on the tape increases, it is known that there is a close correlation between the error rate and drop outs. Accordingly, it is important in a high density magnetic recording medium, such as the above described DAT tape, that the surface of the magnetic layer should be extremely smooth and the number of occurrences of drop outs should be extremely reduced.

It is generally considered that in a magnetic recording medium manufactured as described above, particle components are firmly fixed on the surface of the magnetic layer and the surface is extremely smooth. However, as a result of extensive studies by the present inventors, it was found that insufficiently fixed particle components, such as ferromagnetic particles, are present on the surface of the magnetic layer. These insufficiently fixed particle components happen to drop out during running of the tape and attach on a magnetic head, thereby causing magnetic head clogging, and drop outs in the case of a video tape. At this condition where drop outs occur, the error rate tends to increase in case of a DAT tape. Further, when ferromagnetic particles drop out, the amount of ferromagnetic particles present near the surface of the magnetic layer decreases, and there is also a problem that electromagnetic characteristics are decreased (decrease of output) after running repeatedly.

In this connection, the present inventors have found a method for grinding the surface of a magnetic layer as an approach to decreasing the drop out, head-clogging and output decrease and have already filed an application thereon (JP-A-62-172532). (The term "JP-A" as used herein means an "unexamined published Japanese patent application.)

That is, the invention described in JP-A-62-172532 is to remove particle components which readily drop out and foreign matters attached on the surface of the magnetic layer to decrease the amount of substances which drop from the surface of the magnetic layer by grinding the smooth surface of the magnetic layer with a hard grinding tool such as a diamond wheel or a fixed sapphire blade.

SUMMARY OF THE INVENTION

An object of the present invention is to provide a method for preparing a magnetic recording medium using ferromagnetic particles of hexagonal crystalline ferrite having excellent running durability.

A further object of the present invention is to provide a method for preparing a magnetic recording medium using ferromagnetic particles of novel hexagonal crystalline ferrite having reduced occurrences of dropout and head-clogging and having a low error rate.

To achieve the foregoing and other objects, the present invention provides a method for preparing a magnetic recording medium which comprises surface smoothing a magnetic layer containing ferromagnetic particles of hexagonal crystalline ferrite dispersed in a binder which is provided on the non-magnetic support, and thereafter abrading the surface of the magnetic layer by an abrasive tape.

Thus, as a result of extensive studies by the inventors to decrease the amount of substances that drop out, it has been found that there is another effective approach besides grinding the magnetic layer using a grinding tool. That approach is to abrade the magnetic layer by an abrasive tape, whereby a magnetic recording medium having reduced occurrences of drop outs and head clogging and having excellent running durability can be obtained.

Preferably, the abrasive agents contained in the abrasive tape have a Mohs' hardness of 5 or more.

It is also preferred that the surface roughness Ra (centerline average roughness defined by JIS B 0601) of the abrasive tape is from 0.05 to 0.9.

The abrasive agent contained in the abrasive tape preferably is at least one member selected from the group consisting of $\alpha$-$Al_2O_3$, $SiO_2$, $CR_2O_3$, $\alpha$-$Fe_2O_3$, diamond, $ZnO_2$ and $TiO_2$.

In an especially preferred embodiment of the present invention, a magnetic recording medium is prepared by abrading the surface-smoothing treated magnetic layer by the abrasive tape, grinding with a blade or a rotary blade, and then wiping up the magnetic layer with an unwoven fabric.

The amount of particle components such as ferro magnetic particles which readily drop from the surface of the magnetic layer is reduced by providing an abrading treatment with an abrasive tape in accordance with the present invention. Accordingly, a magnetic recording medium can be prepared wherein magnetic head clogging, drop outs and error rate in the case of a DAT tape caused by the release of particle components at running are reduced.

Further, since in the present invention the number of ferromagnetic particles released from the surface of the magnetic layer becomes smaller even after repeated running, a magnetic recording medium can be prepared in accordance with the present invention wherein the difference between reproduced output at the initial running and the reproduced output after repeated running is small.

In the case when a hardening agent is used as one component for forming a magnetic layer, and since most of any unreacted hardening agents present on the surface of the magnetic layer are removed by the abrading treatment, dust and contaminants never attach on the surface thereof. Therefore, a magnetic recording medium can be prepared in accordance with the present invention having reduced occurrences of drop outs caused by the above attachment of dust and contaminants. The hexagonal crystalline ferrite which is used as ferromagnetic particles in the present invention is suitable for high density recording, and in a magnetic recording medium using the above ferrite, occurrences of drop outs caused by the attachment of foreign matters are reduced, and the error rate is extremely reduced.

Additionally, since the magnetic head is rarely contaminated by the unreacted hardening agents, a magnetic recording medium can be prepared in a accordance with the present invention wherein clogging of a magnetic head caused by the attachment of dust and contaminants hardly occurs.

BRIEF DESCRIPTION OF THE DRAWINGS

The sole drawing figure is a schematic drawing showing the steps of abrading treatment, grinding treatment, and wiping treatment in accordance with one embodiment of the present invention.

DETAILED DESCRIPTION OF THE INVENTION

Figure 1:
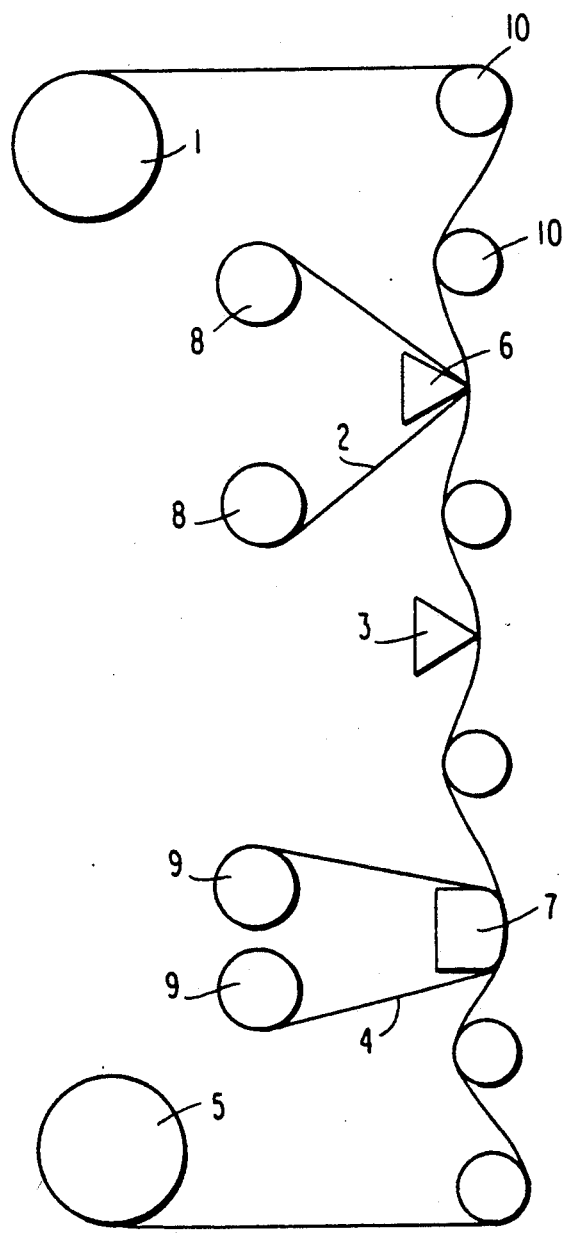

A magnetic recording medium is generally prepared by coating a magnetic coating composition on a non-magnetic support, and then providing the coated layer with a magnetic orientation, a hardening treatment and a surface smoothing treatment and thereafter slitting to a desired shape.

The magnetic recording medium of the present invention is comprised of a non-magnetic support and a magnetic layer provided thereon. The magnetic layer comprises particle components such as ferromagnetic particles and a binder dispersed with the particle components. The binder comprises resin components and if desired, hardening agents.

The magnetic layer can be provided in a conventional manner. For example, a magnetic coating composition can be prepared by mixing, kneading and dispersing resin components, ferromagnetic particles, and if desired, abrasive agents and hardening agents, and then coating on a non-magnetic support.

Non-magnetic supports which can be used in the present invention include films or sheets of polyesters such as polyethylene terephthalate (PET), or polyethylene naphthalate, polyolefins such as polypropylene, cellulose derivatives such as cellulose triacetate or cellulose diacetate, vinyl resins such as polyvinyl chloride or polyvinylidene chloride, and synthetic resins such as polycarbonate, polyamide, polyamide imide or polyimide; non-magnetic metal foils such as aluminum or copper; metal foils such as a stainless steel foil; and paper, ceramic sheets.

The non-magnetic support generally has a thickness of from 2.5 to 100 $\mu$m (micrometer: $10^{-6}$m) and preferably from 3 to 80 $\mu$m.

Resin components which can be used in the binder can be selected from those resin components used for a conventional magnetic coating composition. Suitable resin components include, for example, vinyl chloride copolymers (e.g., vinyl chloride/vinyl acetate copolymer, vinyl chloride/vinyl acetate/vinyl alcohol copolymer, vinyl chloride/vinyl acetate/acrylic acid copolymer, vinyl chloride/vinylidene chloride copolymer, vinyl chloride/ acrylonitrile copolymer, ethylene/vinyl acetate copolymer, and a vinyl chloride copolymer containing a polar group such as —$SO_3Na$ or —$SO_2Na$ and an epoxy group); cellulose derivatives such as a nitrocellulose resin; acrylic resins; polyvinyl acetal resins; polyvinyl butyral resins; epoxy resins; phenoxy resins; and polyurethane resins (e.g., polyester polyurethane resins, polyurethane resins containing a polar group such as —$SO_3Na$ or —$SO_2Na$, polycarbonate polyurethane resins).

When hardening agents are used, polyisocyanate compounds are generally employed. The polyisocyanate compounds can be selected from those that are generally used as a hardening component for a polyurethane resin. Polyisocyanate compounds which can be used include a reaction product (e.g., "Desmodule L-75" prepared by Bayer Co., Ltd.) of tolylene diisocyanate and 1 mole of trimethylol propane, a reaction product of 3 moles of diisocyanate such as xylylene diisocyanate or hexamethylene diisocyanate and 1 mole of trimethylol propane, a buiret adduct product of 3 moles of hexamethylene diisocyanate, an isocyanurate compound of 5 moles of tolylene diisocyanate, an isocyanurate adduct product of 3 moles of tolylene diisocyanate and 2 moles of hexamethylene diisocyanate, and polymers of isophorone diisocyanate and diphenylmethane diisocyanate.

When a hardening treatment is conducted with electron radiation, compounds having a reactive double bond (e.g., urethane acrylate) can be used.

In the present invention, it is preferred that a hard resin such as a vinyl chloride copolymer and a soft resin such as a polyurethane resin be used together in combination as resin components in the binders.

When a hard resin such as a vinyl chloride copolymer and a soft resin such as a polyurethane resin are used in combination, the mixing ratio by weight of the former to the latter is generally from 9/1 to 5/5 and preferably from 9/1 to 6/4. When a hardening agent is used, the mixing ratio by weight of the above resin components to the hardening agent preferably is from 9/1 to 5/5 and more preferably from 9/1 to 6/4.

When a polyurethane resin and vinyl chloride copolymer are used as a resin component and a polyisocyanate compound is used as a hardening agent, the mixing ratio by weight of the polyurethane resin to the polyisocyanate compound is preferably from 1/0.8 to 1/2, and more preferably from 1/1 to 1/1.5. Thus, the softening of the binder can effectively be prevented by adjusting to the above mixing ratio.

The total weight amount of the resin component and the hardening agent is generally from 10 to 100 parts by weight, preferably from 15 to 40 parts by weight, per 100 parts by weight of ferromagnetic particles.

The ferromagnetic particles which are used in the present invention must be hexagonal crystalline ferrite particles. Hexagonal crystalline ferrite particles include barium ferrite, strontium ferrite and lead ferrite. They can be used alone or in combination. Among these, barium ferrite and strontium ferrite are preferred and barium ferrite is the most preferred.

The above barium ferrite has an average particle diameter of preferably from 0.001 to 1.0 μm, and more preferably from 0.01 to 1.0 μm, and a tabular ratio (tabular diameter/ tabuler thickness) of preferably from 2.5 to 5 and more preferably from 2.5 to 4.0. It has a specific gravity of preferably from 4 to 6 g/ml and more preferably from 4 to 5 g/ml, and has a specific surface area ($S_{BET}$) of preferably from 20 to 70 m$^2$/g and more preferably from 20 to 50 m$^2$/g.

The method for preparing these ferromagnetic particles is already known, and ferromagnetic particles used in the present invention can be prepared by any conventional method as described in U.D.C. 621.381.1 and 681.327.66 (Toshiba Review), U.S. Pat. No. 4,407,721 and JP-B-62-23133 (The term "J-B" as used herein means an "examined Japanese patent publication".

The above described resin components, hardening agents and ferromagnetic particles are mixed, kneaded and dispersed with a solvent which is generally used when a magnetic coating composition is prepared, such as methyl ethyl ketone, dioxane, cyclohexanone or ethyl acetate to prepare a magnetic coating composition. Mixing, kneading and dispersing can be done in a conventional manner.

It is needless to say that additives such as abrasive agents (e.g., α-Al$_2$O$_3$, Cr$_2$O$_3$), antistatic agents (e.g., carbon black), lubricating agents (e.g., fatty acid, fatty acid ester, silicon oil) or dispersing agents and filling materials (agents) may be present in the magnetic coating composition in addition to the above components, Particularly when a saturated fatty acid having from 10 to 22 carbon atoms is used as a lubricating agent, the running property of the magnetic recording medium is favorably improved, because the saturated fatty acid tends to orientate in a layer state on the surface of the magnetic layer as a result of abrading with a rotary blade as illustrated hereinafter, and the resulting film of the orientated fatty acid has a high strength and an excellent lubricating property.

The thus prepared magnetic coating composition is coated on the non-magnetic support. Coating can be done using a reverse roll or in a conventional manner as described in Coating Kogaku (Coating Engineering) PP253-277, published by Asakura Shoten, Japan, on Mar. 20, 1971 and U.S. Pat. No. 4,582,757.

The magnetic coating composition preferably is coated so that the magnetic layer of the thus obtained magnetic recording medium has a dry thickness of generally from 0.5 to 10 μm and preferably from 0.5 by 5 μm.

A backing layer maybe provided on the surface which is opposite to the surface provided with a magnetic layer of the non-magnetic support as described in U.S. Pat. Nos. 4,135,016 and 4,567,063. A backing layer is generally a layer prepared by coating a coating composition for forming a backing layer containing granular components, such as abrasive agents or antistatic agents, and a binder dispersed in an organic solvent on the surface of the non-magnetic support which is not coated with magnetic coating composition.

The magnetic layer which is formed by coating with the magnetic coating composition is generally subjected to a magnetic orientation treatment to orientate ferromagnetic particles contained in the magnetic layer, and then dried.

The thus dried coated magnetic layer is provided with surface smoothing treatment. For example, a super calender roll is used for surface smoothing treatment. As a result of surface smoothing treatment, pores generated by the removal of solvents upon drying disappear, thereby improving the packing density of the ferromagnetic particles present in the magnetic layer, whereby a magnetic recording medium having high electromagnetic characteristics can be obtained. The above magnetic orientation and surface smoothing treatment are described in U.S. Pat. No. 3,473,960.

In the method of present invention, the surface of the surface smoothed magnetic layer, or the surface of the magnetic layer and the backing layer are subjected to abrading treatment by an abrasive tape. In a particularly preferred embodiment of the present invention, the surface abraded with an abrasive tape preferably is then ground with a rotary blade and the like, and then wiped with an unwoven fabric. In this case, the order of which abrading treatment and wiping treatment are carried out is not be limited to the above.

At the time of the surface smoothing treatment, When a hardening agent is used as a binder forming component, 90 wt % or more of the hardening agent contained in the magnetic layer generally remains unreacted. Therefore, it is preferred that 50 wt % or more and particularly 80 wt % or more of the hardening agent be reacted by a hardening treatment and then the next step be followed.

Hardening treatment includes a hardening treatment by heating and a hardening treatment by electron beam exposure, and this invention can use any one of these.

The unreacted hardening agent present in the magnetic layer which is subjected to the hardening treatment after the surface smoothing treatment such as a super calendering treatment is reacted with, resin components such as for example, vinyl chloride copolymers or polyurethane resins to form a three-dimensional cross linking structure.

A hardening treatment by heating itself is known and can be done in the represent invention.

For example, a hardening treatment by heating is done generally at 40° C. or more and preferably at from 50° to 80° C. for generally 20 hours or more and preferably from 24 hours to 7 days. Hardening treatment by electron beam exposure itself is also known and can be used in the present invention.

The thus hardened laminate (magnetic tape) can be then slit to a desired shape.

Cutting can be done using a conventional cutting machine such as a slitter under a normal condition.

The surface of the magnetic layer of the thus hardened and slit laminate, or the surfaces of the magnetic layer and the backing layer, are abraded by slowly rotating a belt of the abrasive tape. In this instance, the abrading treatment is done at the rate of speed of the belt of from 1 to 3 cm/min. in a winding direction opposite to the winding direction of the magnetic tape.

FIG. 1 is a schematic drawing showing the steps of an abrading, a grinding and a wiping treatment.

As shown in FIG. 1, a magnetic tape is sent forward from a sending-out roll 1, abraded with an abrasive tape 2 and successively ground with a fixed blade 3, wiped with an unwoven fabric 4 and finally wound up with a take-up roll 5. Thus the steps are terminated. The sending rolls 10 are provided for smoothing the magnetic tape as it moves forward from sending-out roll 1.

Abrasive tape 2 travels by a rotary roll 8 at a rate of speed of from 1 to 3 cm/min. in an opposite direction to the forward direction of the magnetic tape, and contacts and abrades the surface of the magnetic layer, while being pressed by a pad 6.

Although not shown in FIG. 1, abrading by an abrasive tape may occur at two or more locations. In addition, when not only the surface of the magnetic layer but also that of the backing layer is abraded, an abrading station or location should be provided at the opposite side.

Fixed blade 3 may be or may not be used. Further, a rotary blade may be used instead of the fixed blade. In addition, both blades may be used.

When not only the surface of the magnetic layer but also that of the backing layer is abraded, the fixed blade and/or the rotary blade can be provided at the opposite side.

Unwoven fabric 4 travels by a rotary roll 9 at a rate of speed of from 0.5 to 10 cm/min. in an opposite direction to the forward direction of the magnetic tape, and contacts and wipes the surface of the magnetic layer, while being pressed by a pad 7.

Wiping an unwoven fabric may occur at two or more locations. In addition, when not only the surface of the magnetic layer but also that of the backing layer is wiped, a wiping station should be provided at the opposite side.

It is preferred that the abrasive tape used in the present invention is one which is normally or conventionally used for abrading a head of a cassette deck, a video deck and so on. The main purposes of such an abrasive tape are to finish the surface of a head, to form a tipping shape of the head and to avoid chipping of the head.

The abrasive tape used in the abrading treatment of the present invention preferably includes at least one abrasive agent having a Mohs' hardness of generally 5 or more and preferably from 5 to 9 and selected from the group consisting of, for example, $\alpha\text{-Al}_2\text{O}_3$, $\text{SiO}_2$, $\text{Cr}_2\text{O}_3$, $\alpha\text{-Fe}_2\text{O}_3$, diamond, $\text{ZnO}_2$ and $\text{TiO}_2$.

The abrasive tape used in the present invention can be prepared as follows. The above described abrasive agents are dispersed in a binder containing binding agents and additives, coated on a support, dried and slit to a predetermined size. The binder which can be used for preparing the abrasive tape includes thermoplastic resins, thermosetting resins and reactive resins, which are used alone or in combination. The mixing ratio of the abrasive agent and the binder preferably is from 10 to 200 parts by weight of the binder and more preferably from 50 to 200 parts by weight of the binder, per 100 weight parts of the abrasive agent. Materials which can be used for the support for the abrasive tape include films or sheets compressed of synthetic resins of polyesters such as polyethylene terephthalate (PET), polyolefins, such as polypropylene, cellulose derivatives, vinyl type resins, polycarbonate and polyamide; foils of non-magnetic metals such as aluminum or copper; metal foils such as a stainless steel foil; paper and ceramic sheets.

The abrasive tape used in the present invention has a surface roughness (center line average roughness) Ra of preferably from 0.05 to 0.9 and more preferably from 0.05 to 0.05. The surface roughness Ra (center line average roughness) of the abrasive tape is measured under the following condition. A center line average roughness measuring device systems "SURFCOM 400B" "SURFCOM 403B" and "SURFCOM 404B" were used, having a cut off value: 0.8 mm, a rate of speed: 0.3 mm/sec, a needle/pressure: 0.07 g, a needle diameter: 2 $\mu$mR, and a range: 20 kHz/0.5 mm. Any abrasive tape can be used as long as it meets the above surface roughness Ra of from 0.005 to 0.9, and commercially available abrasive tapes can be also used.

By subjecting the magnetic layer to an abrading treatment using the above described abrasive tape, granular components such as ferromagnetic particles or abrasive agents which extrude from the surface of the magnetic layer, unreacted hardening agents present on the surface of the magnetic layer and foreign matter attached on the surface (for example, dust and contaminants which are present in air and attach on the surface of the magnetic layer when a magnetic recording medium is prepared.) are abraded together with the binder present near the surface of the magnetic layer in a depth of generally from 0.01 to 5 $\mu$m and thus the surface of the magnetic layer is smoothed.

When a backing layer is provided with an abrading treatment, granular components such as ferromagnetic particles present in the backing layer do not drop out to any substantial extent. Therefore, when a magnetic recording medium cut to a tape shape is used in a wound state, hardly any granular components drop out or are released from the surface of the backing layer, and therefore hardly any granular components attach on the surface of the magnetic layer and cause drop out or head clogging.

Materials which can be used for the wiping treatment include a suede-like unwoven fabric having a single layer structure compressed of elaborately entangled polyester fibers and not substantially containing a binder component such as polyurethane (e.g., "Ecxaine" (a trade name, produced by Toray Industries, Inc.; "Kulrlino", a trade name, produced by KURARAY CO., LTD.), and an unwoven fabric comprised of polyester fibers bonded with a binder such as polyurethane (e.g., "Vilene", a trade name, produced by Nippon Vilene Co., Ltd.).

The attached foreign matters and organic substances on the magnetic layer and/or the backing layer can be completely wiped off by the wiping treatment, thereby decreasing drop outs and head clogging.

It is more preferred to conduct a grinding treatment before conducting the wiping treatment with an unwoven fabric. A suitable grinding treatment is disclosed in JP-A-62-172532. Grinding tools which can be used include a fixed blade, a diamond wheel and a rotary blade.

The fixed blade which can be used is, for example, a blade having a very hard substance at the are which contacts the surface of the magnetic layer or the backing layer. The blade can be generally comprised of sapphire, alumina, cermet, zirconia (zirconium oxide), silicon nitride, silicon carbide, diamond and super hard alloy.

The diamond wheel can be a rotary cylindrical grinding tool the periphery of which is sintered with diamond.

The rotary blade can be a grinding tool comprised of a rotary body equipped with at least one blade at the periphery of the body along the rotating shaft.

By providing the above described grinding treatment, the effect of the abrading treatment using the abrasive tape becomes greater.

The above description mainly illustrate the case where the laminate (magnetic tape) provided with a surface smoothing treatment is cut, and thereafter the surface of the magnetic layer or the surfaces of the magnetic layer and the backing layer are abraded by an abrasive tape. The present invention should not be limited to this case only. The order of cutting and abrading steps is optional. For example, the abrading treatment can be provided while the magnetic tape is being cut, or the abrading treatment can be provided before the magnetic tape is cut.

A hardening reaction gradually proceeds even though a specific hardening treatment is not conducted. Therefore, after the magnetic tape is provided with surface smoothing treatment, it can be abraded without providing the hardening treatment.

The present invention will be illustrated in more detail by the following Examples and Comparative Examples. In the Examples and Comparative Examples, all parts are by weight.

EXAMPLE 1

The following components for a magnetic coating composition were uniformly mixed, kneaded and dispersed in a ball mill to prepare a magnetic coating composition.

The viscosity of the thus obtained magnetic coating composition was adjusted to 70 ps and then the coating composition was coated using a reverse roll on a polyethylene terephthalate support having a thickness of 10 μm so that the dry thickness of the magnetic layer was 3.0 μm.

| Components for a magnetic coating composition | |
|---|---|
| Hexagonal crystalline barium ferrite (specific surface area ($S_{BET}$): 40 m$^2$/g, Tabular ratio: 3) | 100 parts |
| Copolymer of vinyl chloride/vinyl acetate/ maleic anhydride ("400 × 110A", produced by Nippon Geon Co., Ltd.) | 14 parts |
| Polyurethane resins ("Nippollan N-2304", produced by Nippon Polyurethane Co., Ltd.) | 12 parts |
| Polyisocyanate compounds ("Desmodule L-75", produced by Bayer Co., Ltd.) | 12 parts |
| α-alumina | 10 parts |
| Stearic acid | 5 parts |
| Butyl stearate | 6 parts |
| Carbon black | 1 part |
| Methyl ethyl ketone | 325 parts |

In addition, components of a coating composition for forming a backing layer were uniformly mixed, kneaded and dispersed in a ball mill to prepare a coating composition for forming a backing layer.

The viscosity of the thus obtained coating composition for the backing layer was adjusted to 10 ps, and then the coating composition for the backing layer was coated on the support using a reverse roll on the surface opposite to the surface provided with the magnetic coating composition so that the dry thickness of the backing layer was 0.7 μm.

| Components of a coating composition for a backing layer | |
|---|---|
| Carbon black (average particle diameter: 0.05 μm) | 35 parts |
| α-Alumina (Average particle diameter: 0.15 μm, Maximum particle diameter: 0.3 μm) | 1.8 parts |
| Nitrocellulose | 20 parts |
| Polyurethane resins ("Nippollan N-2304" produced by Nippon Polyurethane Co., Ltd.) | 10 parts |
| Polyisocyanate compound ("Collonate L", produced by Nippon Polyurethane Co., Ltd.) | 10 parts |
| Methyl ethyl ketone | 600 parts |

The non-magnetic support provided with the magnetic coating composition and the coating composition for the backing layer was subjected to magnetic orientation using magnets of 3000 gauss, while the magnetic coating composition was undried. Then, the magnetic coating composition was dried and was subjected to supercalendering treatment to prepare a laminate (magnetic tape) comprising a nonmagnetic support, a magnetic layer and a backing layer.

This laminate was heated at 60° C. for 24 hours to harden the polyisocyanate compound contained in the magnetic layer, slit to a width of 3.8 mm, was subjected to the following abrading treatment using an abrasive tape having a surface roughness Ra of 0.07 having $Cr_2O_3$ as an abrasive agent ("K-10000", produced by Fuji Photo Film Co., Ltd.) and wiped by a suede like unwoven fabric to prepare a DAT tape.

Abrading treatment

As shown in FIG. 1, abrasive tape 2 travels by a rotary roll 8 at a rate of speed of 1.5 cm/min. in the direction opposite to the forward direction of the DAT tape, and contacts and abrades the surface of the magnetic layer, while being pressed by a pad 6.

EXAMPLE 2

The same procedure as in Example 1 was repeated to prepare a DAT tape, except that after the abrading treatment using the abrasive tape, the surface of the magnetic layer was ground by a sapphire blade in the following manner.

Sapphire blade treatment

A sapphire blade (which is a fixed blade) having a tip angle of 60° (width: 5 mm, length 35 mm, produced by Kyosera Co., Ltd.) was brought into contact with the magnetic layer at a contact angle of 80° with tensile strength of 50 g/3.8 mm, and ground the magnetic layer. This treatment was conducted one time using four sapphire blades at the same time.

EXAMPLE 3

The same procedure as in Example 1 was repeated to prepare a DAT tape, except that after the abrading treatment using the abrasive tape, the surface of the magnetic layer was ground by a diamond wheel in the following manner.

Diamond wheel treatment

A diamond wheel, the periphery of the iron core material of which was sintered with diamond in a thickness of 1.5 mm (diameter: 25 mm, width: 25.6 mm, degree of granularity: No. 2000, produced by Orient Dia Co., Ltd.) was rotated 2000 times per minute in the direction opposite to the forward direction of the magnetic tape, and contacted the tape at a contact angle of 80° with tensile strength of 50 g/3.8 mm and ground the hardened layer. The diamond wheel contacted the magnetic layer twice.

EXAMPLE 4

The same procedure as in Example 1 was repeated to prepare a DAT tape, except that after the abrading treatment using the abrasive tape, the surface of the magnetic layer was grounded by a rotary blade.

Rotary blade treatment

A rotary blade (the fixing angel $\theta$:65°) composed of a metal cylinder (length: 35 mm, diameter: 20 mm, diameter of a void: 12 mm) which was equipped with a sapphire blade at a length of 35 mm in the shape of a triangular prism having a cross sectional view of a regular triangle of each 5 mm side was used.

This rotary blade rotated 1000 times per minute in the direction opposite to the forward direction of the magnetic tape, and contacted the surface of the magnetic tape with a contact angle of 120°, with a tensile strength of 50 g/3.8 mm and ground it.

EXAMPLE 5

The same procedure as in Example 1 was repeated to prepare a DAT tape, except that after the abrading treatment using the abrasive tape, the surface of the magnetic layer was gorund first by the rotary blade of Example 4 and by the sapphire blade of Example 2 in the above described manner.

EXAMPLE 6

The same procedure as in Example 1 was repeated to prepare a DAT tape, except that the abrading treatment was conducted using an abrasive tape having a surface roughness RA of 0.07 and using $\alpha$-Al$_2$O$_3$ as an abrasive agent ("A-2000", produced by Fuji Photo Film Co., Ltd.) instead of the abrasive tape having a surface roughness Ra of 0.07 and using Cr$_2$O$_3$ as an abrasive agent ("K-10000", produced by Fuji Photo Film Co., Ltd.) of Example 1, and thereafter the surface of the magnetic layer was ground by a sapphire blade of Example 2 in the above described manner.

COMPARATIVE EXAMPLE 1

The same procedure as in Example 1 was repeated to prepare a DAT tape, except that abrading treatment by an abrasive tape and wiping treatment by a suede-like unwoven fabric were not conducted.

EVALUATION

Decrease of output

Recording was made on the thus obtained DAT tape of 30 min-length using the DAT deck ("DTC-1000 ES" manufactured by SONY corporation) at 5° C. and 30% RH. Recorded signals were reproduced ten times, and the tenth reproduced output was measured when the initial reproduced output was assumed to be 0 dB.

Magnetic head clogging

Tapes were made running in the same manner as above, and magnetic head clogging immediately after running was evaluated on the following three basis.

AA: 0-3 head cloggings are observed.
BB: 4-10 head cloggings are observed.
CC: many head cloggings are observed.

Block error rate

Block error rate ($C_1$ (1 channel) signal was selected from the reproduced signals and the block error rate is the error of $C_1$ signal to the whole block of $C_1$ signal: $C_1$ error) was measured using the thus obtained DAT tape on the above described DAT deck to measure the error rate.

The decrease of output, magnetic head clogging and block error rate of tapes in all Examples and Comparative Example were measured under the above described conditions.

TABLE 1

|  | Decrease of Output (dB) | Magnetic Head Clogging | Block Error Rate |
| --- | --- | --- | --- |
| Example 1 | −2 | AA | $1 \times 10^{-4}$ |
| 2 | −1 | AA | $4 \times 10^{-3}$ |
| 3 | −1 | AA | $3 \times 10^{-3}$ |
| 4 | −1 | AA | $3.5 \times 10^{-3}$ |
| 5 | 0 | AA | $2.7 \times 10^{-3}$ |
| 6 | −1 | AA | $3.8 \times 10^{-3}$ |
| Comparative Example 1 | −5 | BB-CC | $5 \times 10^{-1}$ |

As is apparent from the result of Table 1, the magnetic recording medium in accordance with the present invention could obtain reduced decrease of drop out, few magnetic head clogging, and small block error rate.

While the invention has been described in detail and with reference to specific embodiments thereof, it will be apparent to one skilled in the art that various changes and modifications can be made therein without departing form the spirit and scope thereof.

What is claimed is:

1. A method for preparing a magnetic recording medium comprising a non-magnetic support having thereon a magnetic layer comprised of ferromagnetic particles of tabular hexagonal crystalline ferrite and a binder containing a low molecular weight component and a hardener which comprises smoothing the surface of the magnetic layer by a supercalendering treatment and thereafter abrading the surface thereof by an abrasive tape.

2. The method as claimed in claim 1, wherein said abrasive tape contains an abrasive agent having a Mohs' hardness of 5 or more.

3. The method as claimed in claim 1, wherein a surface roughness of said abrasive tape is from 0.05 to 0.9.

4. The method as claimed in claim 1 wherein an abrasive agent contained in said abrasive tape is at least a member selected from the group consisting of $\alpha$-Al$_2$O$_3$, SiO$_2$, Cr$_2$O$_3$, $\alpha$-Fe$_2$O$_3$, diamond, ZnO$_2$ and TiO$_2$.

5. The method as claimed in claim 1, further comprising grinding with a fixed blade, a diamond wheel or a rotary blade, and then wiping up said magnetic layer with an unwoven fabric.

6. The method as claimed in claim 1, wherein said tabular hexagonal crystalline ferrite is barium ferrite or strontium ferrite.

7. The method as claimed in claim 1, wherein said tabular hexagonal crystalline ferrite is barium ferrite having an average particle diameter of from 0.001 to 1.0 $\mu$m, a tabular ratio of from 2.5 to 5 and a specific gravity of from 4 to 6 g/ml and a specific surface area of from 20 to 70 m$^2$/g.

* * * * *